April 22, 1969     L. F. LUCKENBILL ET AL     3,439,947
FIRE HYDRANT STEM COUPLING
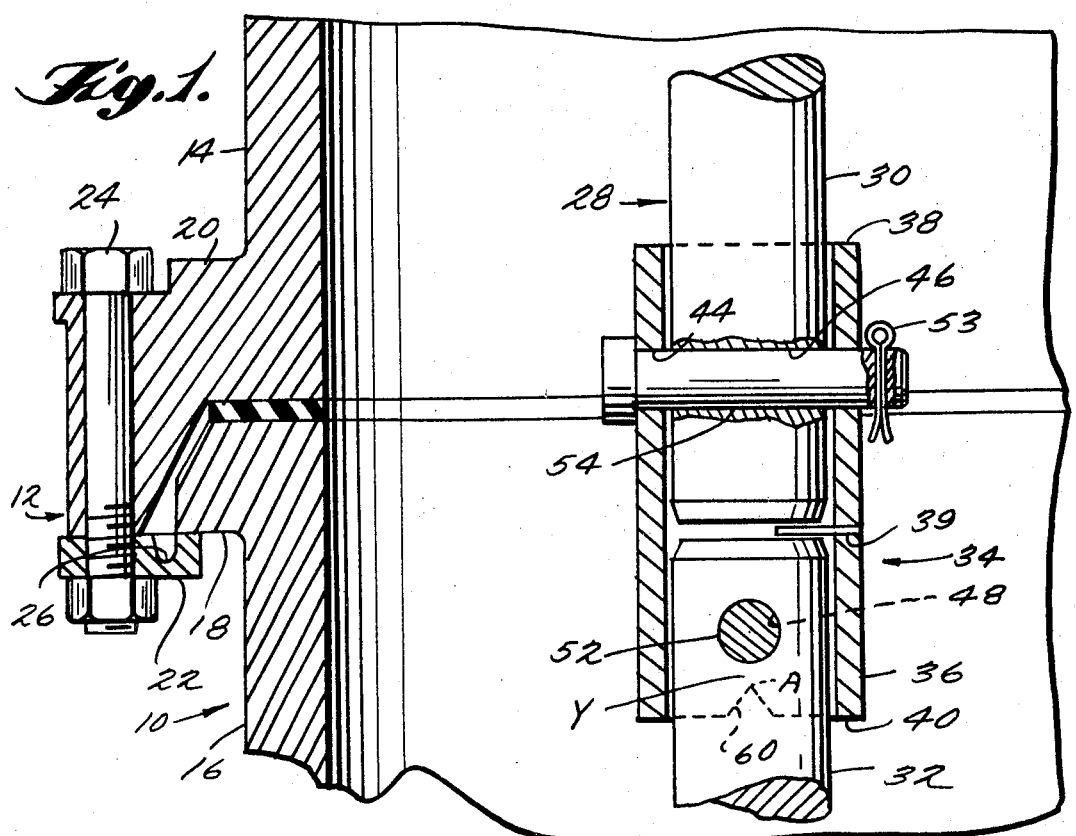
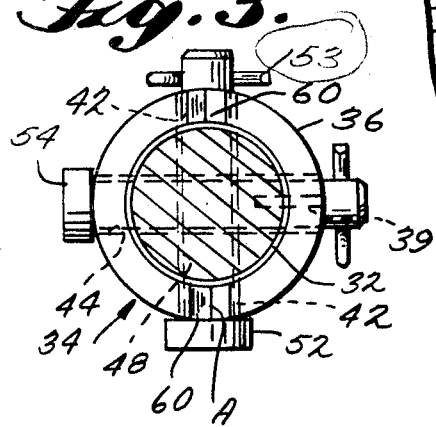
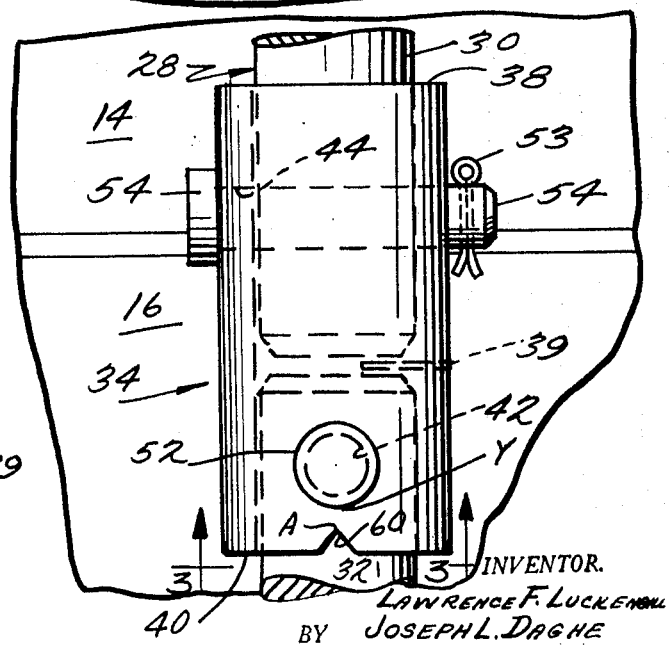
INVENTOR.
LAWRENCE F. LUCKENBILL
JOSEPH L. DAGHE
BY
Cushman, Darby & Cushman
ATTORNEYS

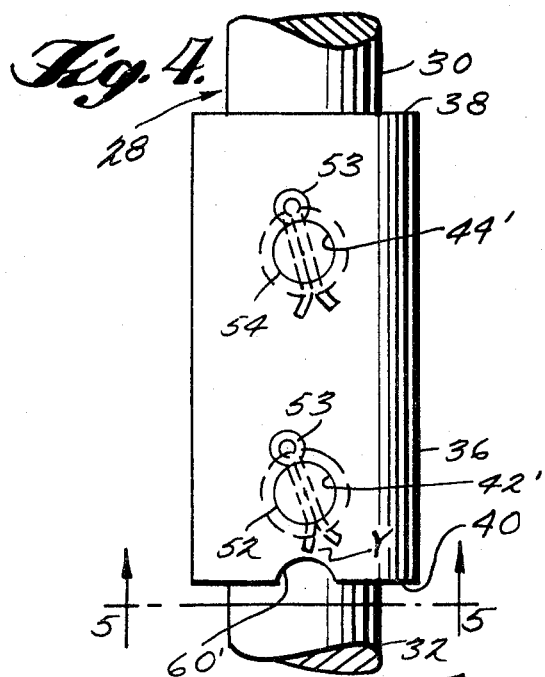
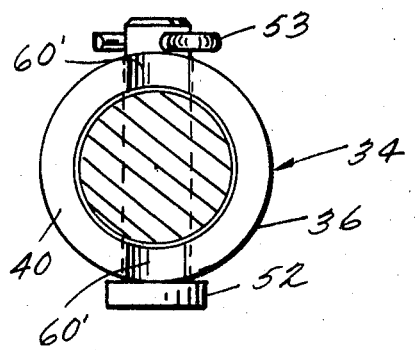
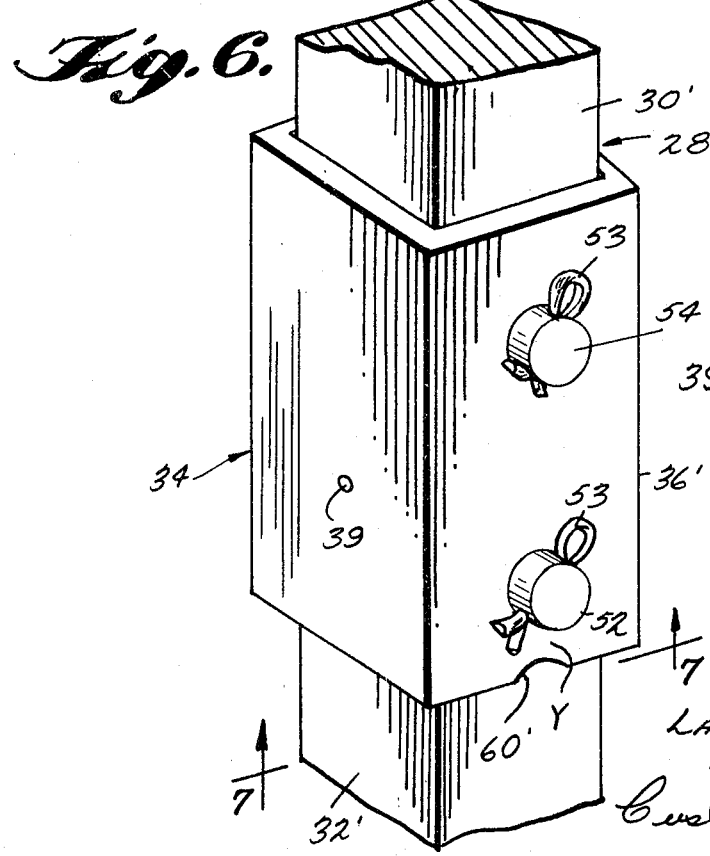
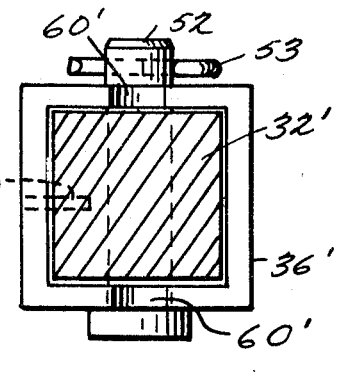

United States Patent Office 3,439,947
Patented Apr. 22, 1969

3,439,947
FIRE HYDRANT STEM COUPLING
Lawrence F. Luckenbill and Joseph L. Daghe, Decatur, Ill., assignors to Mueller Co., Decatur, Ill., a corporation of Illinois
Filed Feb. 10, 1967, Ser. No. 615,235
Int. Cl. F16b 7/00; F16d 1/00; F16l 21/00, 35/00, 37/00
U.S. Cl. 287—108                              6 Claims

ABSTRACT OF THE DISCLOSURE

A coupling arrangement for a two-part valve stem of a fire hydrant capable of being torn, ripped or sheared in a generally longitudinal direction when the upper barrel section of the fire hydrant is knocked over and broken from the lower barrel section by a vehicle or the like. The sleeve member of the coupling is made from a ductile material which permits the sleeve to be torn, ripped or sheared without pieces of the sleeve dropping downwardly in the lower barrel section of the hydrant where damage may occur to the hydrant valve or where subsequent operation may be impaired.

---

The present invention relates to an improved fire hydrant stem coupling arrangement and, more particularly, to a coupling arrangement which utilizes a sleeve member capable of being torn, ripped or sheared in a generally longitudinal direction when the upper barrel or a fire hydrant is knocked off of the lower barrel by a vehicle or the like, the coupling protecting the hydrant valve in the lower barrel.

Fire hydrants have heretofore been made with plural barrel sections, the lower of the barrel sections being buried partially in the ground and housing a hydrant valve. The upper barrel section is detachably connected to the lower barrel section by means of a frangible sectional coupling ring or the like. One such coupling ring is disclosed in the prior United States patent of Frank H. Mueller and John J. Smith No. 3,002,775 issued Oct. 3, 1961, whereas another such frangible coupling for hydrant barrels is disclosed in the copending application of Frank H. Mueller and Oscar Brown Ser. No. 368,808 and filed May 20, 1964 and now U.S. Patent No. 3,331,397. When a fire hydrant utilizes sectional hydrant barrels coupled by frangible parts, the valve stem of the hydrant is made at least in two sections and is also provided with replaceable frangible coupling between the same. Such couplings between the sections of the valve stem have been heretofore known in the art and fire hydrants of this type may be knocked over by a vehicle or the like without the escape of water and then reassembled merely by replacing the frangible parts. Of course, if the upper barrel section or the upper valve stem section were damaged, then those parts were also replaced but this did not normally occur.

Among the frangible valve stem couplings heretofore used, the sleeve member between the upper and lower valve stem sections was made of cast iron and was provided with weakening groove circumferentially about the same. The sleeve member was attached to the valve stem sections by pins force-fitted through aligned transverse bores in the sleeve member and in the stem sections or by pins provided with threads for being threadedly received in a threaded bore of the sleeve member. In some arrangements the interior of the sleeve was provided with threaded portions of different pitch to receive the threaded ends of the valve stem sections. While such prior types of valve stem coupling arrangements have been widely used, they did have some disadvantages in that they were made from a very brittle material such as cast iron and consequently when fractured small pieces of the same fell down into the lower barrel section where they sometimes damaged the hydrant valve or interfered with its operation at a later date. Another disadvantage to such prior valve stem coupling arrangements is that a section of the coupling sleeve member always remained on the lower section of the valve stem after fracture with the coupling pins often frozen or rusted in place. This made quick repair of the hydrant difficult and sometimes costly. Additionally, the prior coupling sleeve members oftentimes were damaged in transit or damaged in the assembly of the sleeve on the sections of the valve stem due to the brittleness of the castings. If such damage to the sleeve member occurred during the assembly, the fracture of the coupling sleeve member was in such a manner that the hydrant could not be operated by emergency personnel in case of a fire.

Accordingly, it is an object of the present invention to provide an improved coupling arrangement for fire hydrant valve stems, the coupling arrangements embodying an improved coupling sleeve member enabling an easier and safer initial installation as well as easier and quicker repair of a hydrant knocked over by a vehicle or the like.

Another object of the present invention is to provide an improved hydrant valve stem coupling arrangement which permits the stem coupling to be located further below the breakable barrel flange and yet permits adequate room for a repairman to work in on even small size hydrants.

A still further object of the present invention is to provide an improved fire hydrant stem coupling arrangement utilizing a sleeve member made of a ductile material and capable of being torn, ripped or sheared without small pieces breaking from the same and falling into the lower barrel section of the hydrant resulting in possible damage to or interference in the operation of the hydrant valve.

Another object of the present invention is to provide a coupling arrangement for fire hydrant valve stem sections in which the improved sleeve member is so designed that it is torn, ripped or sheared in a generally longitudinal direction when the hydrant is hit by a vehicle, there being primarily and initially a straight pulling and tearing away of the sleeve with some possible bending action subsequently.

Ancillary to the immediately precdeing object, it is a further object to provide a coupling arrangement in which the sleeve member of the coupling and the valve stem sections have a loose fit thereby reducing bending stresses created in the stem sections at the time of coupling failure. Additionally, the loose fit of the coupling arrangement provides for easy assembly and disassembly of the same.

A still further object of the present invention is to provide an improved coupling arrangement which does not require special tools other than the tools normally carried by the workman for assembly or disassembly of the same.

Still another object of the present invention is to provide an improved coupling arrangement for use in coupling sections of the valve stem of a fire hydrant, the parts of the coupling arrangement being corrosive resistant.

Another object of the present invention is to provide an improved coupling arrangement for use in coupling sections of the valve stem of a fire hydrant, the tubular sleeve coupling having its spaced transverse bores for receiving the coupling pins on axes 90° to one another to thereby allow for straighter alignment of the valve stem coupling sleeve member and the valve stem sections when the coupling is assembled.

A still further object of the present invention is to provide means on a coupling sleeve member for a stem coupling of a fire hydrant which will prevent improper assembly of the coupling sleeve on the upper and lower stem sections of the valve stem.

These and other objects and advantages of the present invention will become more apparent from the following description in the specification, claims and accompanying drawings in which:

FIGURE 1 is a fragmentary view partly in vertical section of a fire hydrant, the fire hydrant embodying the coupling arrangement of the present invention;

FIGURE 2 is a fragmentary elevational view of the coupling arrangement of the present invention;

FIGURE 3 is a sectional view taken on the line 3—3 of FIGURE 2;

FIGURE 4 is an elevational view similar to FIGURE 2 but illustrating a modification of the sleeve member of FIGURE 2;

FIGURE 5 is a sectional view taken on the line 5—5 of FIGURE 4;

FIGURE 6 is a perspective view illustrating a further modified coupling arrangement utilized when the hydrant is provided with valve stem sections that are noncircular in cross-section;

FIGURE 7 is a sectional view taken on the line 7—7 of FIGURE 6.

Referring now ot the drawings wherein like reference numerals or characters represent like or similar parts, there is disclosed in FIGURE 1 a fire hydrant 10 having a plural section hydrant barrel 12 comprising an upper barrel section or part 14 and a lower barrel section or part 16. The lower barrel section or part 16 contains the usual hydrant valve (not shown) and it is normally buried in the ground with only the upper portion thereof extending slightly above ground level. Barrel sections or parts 14 and 16 are secured together in end to end relationship by means of a rupturable or fracturable joint including the peripheral flanges 18 and 20 fastened together by a frangible sectional coupling ring 22 and bolts 24. The frangible sectional coupling ring 22 is provided with a weakening groove 26 or it may be of the type shown in the aforementioned copending application Ser. No. 368,808 and, therefore, a more complete description of the same is not repeated herein.

A valve stem generally designated at 28 extends longitudinally within the barrel sections 14 and 16 and includes an upper valve stem section or part 30 and a lower valve stem section or part 32. The upper section 30 extends upwardly through the upper barrel section 14 and is provided at its upper end with means for operating the hydrant in the usual manner whereas the lower valve stem section 32 extends downwardly through lower buried section 16 and is connected to the usual hydrant valve (not shown) housed therein.

As shown in FIGURES 1, 2 and 3 the upper and lower sections 30 and 32 of the valve stem 28 are coupled together by a stem coupling arrangement generally indicated at 34. In more detail, the improved coupling arrangement 34 includes an elongated sleeve member 36 having a substantial uniform wall thickness. The sleeve member 36 is made of a ductile material, for example, a high yield steel with a yield strength slightly lower than its ultimate strength. By utilizing a ductile material rather than cast iron, the ductile material will tear, rip or shear instead of fracturing into small pieces as would a sleeve of brittle cast iron. Sleeve member 36 is provided with oppositely disposed end wall surfaces 38 and 40 respectively. Additionally, the sleeve member 36 is provided with a first transverse bore 42 and a second transverse bore 44 (FIGURES 2 and 3), the bores being spaced longitudinally of one another and oriented at 90° to each other. By having the axes of the bores 42 and 44 lying in parallel planes but at an angle of 90° to each other, straighter alignment of the valve stem sections 30 and 32 and sleeve member 36 results. Additionally, it will be noted that the first transversely extending bore 42 is positioned closer to its adjacent end wall surface 40 than the transversely extending bore 44 is to its adjacent end wall surface 38. The purpose of this critical positioning of the bores 42 and 44 relative to one another will appear more fully later in the specification.

The lower end portion of the upper section 30 of valve stem 28 is provided with a transverse bore 46 (FIGURE 1) whereas the upper end portion of the lower section 32 of the valve stem 28 is provided with a transverse bore 48 (FIGURES 1 and 3), the bores 46 and 48 being substantially the same diameter as the bores 42 and 44 in sleeve member 36. As will now be appreciated, the coupling sleeve member 36 is slipped over the upper end of the lower section 32 of valve stem 28 until its bore 42 is in alignment with the bore 48. A loose fitting clevis pin 52 is then inserted through the aligned bores 42 and 48 and is held in position by a cotter pin 53 which has sufficient clearance with the outer surface of the sleeve member 36 so that flaring of the sleeve member during failure does not shear the cotter pin off. Once the sleeve member 36 has been assembled on the lower section 32 of the valve stem 28 then the lower end of the upper section 30 of valve stem 28 is slid downwardly into the sleeve member 36 until its bore 46 is aligned with the bore 44 of the sleeve member. A clevis pin 54 is inserted through the aligned bores 44 and 46 and held in its position by a cotter pin similar to the cotter pin 53. The upper barrel section 14 can then be assembled onto the lower barrel section 16. The clevis pins 52 and 54 are preferably made of a stainless steel having a higher yield strength and ultimate strength than the yield strength and ultimate strength of the sleeve member 36 so that the failure will always occur in the sleeve member. Of course, the relative sizes of the clevis pin diameter and the sleeve thickness could be such that the sleeve would still fail before the pin without having the yield strength relationship as specified above. Additionally, it will be noted that the sleeve member 36 may be cadmium plated or plated with other corrosion resisting materials so that the entire coupling assembly 34 including the stainless steel clevis pins 52 and 54 is resistant to corrosion. Heretofore in the specification it was mentioned that the ductile material from which the sleeve member 36 is made is preferably steel. Of course, other ductile materials could be used; for example, brass, cast ductile iron, malleable iron, cast steel or the like; so long as the yield strength and ultimate strength of the material is less than that of the clevis pins 52 and 54 or the relative size of the sleeve thickness to the diameter of the pins is such that the sleeve would fail first.

By referring to FIGURES 1 through 3 inclusive, it will be noted that the downwardly facing end wall surface 40 is provided with a notch 60 that is triangular in shape with its apex A lying in a longitudinal plane of the sleeve 36 passing through the axis bore 42. A generally longitudinally extending weakened area Y is thus provided between the apex A of the notch 60 and the bore 42. By providing the sleeve member 36 of uniform wall thickness with the longitudinally extending weakened portion Y, the sleeve will tear, rip or shear only in the area of the weakened portion Y when there is sufficient axial force or pull applied to the same when the upper half of the hydrant is knocked over. The area Y will tear about the clevis pin 52 as the pin has a higher yield strength and ultimate strength than the sleeve member and, thus, the only part remaining on the lower stem section 32 will be the clevis pin 52 and its cotter pin 53. By having a coupling assembly 34 with a very loose fit with respect to the valve stem sections 30 and 32, there is less bending stress created in the valve stem sections when the coupling assembly is failing due to the knocking over of the upper barrel section 14 of hydrant 10. Additionally, it will be appreciated that by providing a longitudinally weakened section Y, rather than a circumferential weakened section there could be failure at this particular point during shipment, assembly or overclosing and yet the hydrant valve could be still opened by emergency personnel in case of a fire because of the considerable wall area of the sleeve member circumferentially of the weakened area. In other words, a partial fracture caused in shipment or assembly or a partial fracture caused by over-closing of the hydrant valve does not render the hydrant inoperative as would be the case of those hydrants utilizing sleeves made of cast iron or other brittle material or in a sleeve member which transversely shears.

It will be noted by reference to FIGURES 1 and 2 that the opposed ends of the upper valve stem section 30 and the lower valve stem section 32 are considerably below the upper end surface or the flange 18 of the lower barrel section 16. By having such an arrangement, the hydrant valve is further protected when a wheel of a vehicle goes over the upper end of the lower barrel section as it cannot touch and injure or damage the stem section 32. In the sleeve members of most of the prior art, the upper end of the lower section of the valve stem could not be placed this far beneath the upper end of the barrel section as a portion of the sleeve member remained on the lower section of the valve stem and the repairman had to have sufficient access and room in order to remove the same. As heretofore mentioned, the improved coupling assembly 34 when it fails is completely removed from the lower section 32 of the valve stem with only the clevis pin 52 and cotter pin 53 remaining. Of course, the clevis pin 52 and cotter pin 53 can be easily removed as the clevis pin has a loose fit in the bore 48 through the upper end of the lower section of 32 of valve stem 28.

From the above, it will be apparent that it is necessary to position the bore 42 closer to the end wall 40 than the bore 44 is from its adjacent end wall 38. This positioning of the bores in the sleeve member 36 coupled with the provision of the notch 60 insures the tearing of the sleeve member away from the lower clevis pin 52. In order to assist the assembly of the coupling and to insure proper positioning of the sleeve member 36 of the lower section 32 of valve stem 28, the sleeve member is provided with a radially inwardly extending roll pin 39 properly positioned in between the bores 42 and 44 so that only the lower clevis pin bore or hole 48 can be aligned with the bore 42 in the sleeve member. Additionally, it will be noted that the bore 48 in the lower stem section 32 is closer to the end of that stem section than the bore 46 is to the end of the stem section 30. When the coupling is formed, the sleeve member 36 is slipped onto the lower stem section 32 until the end of the section engages the roll pin 39. If the sleeve member is in proper position, the bores of the sleeve member and the lower stem section will align for reception of the clevis pin. The provision of the roll pin 39 and the positioning of the bores 46 and 48 in the stem sections 30 and 32 respectively insures that service personnel will properly position and install the sleeve member. The roll pin 39 is preferably plated with cadmium or the like to make it corrosive resistant.

The arrangement shown in FIGURES 4 and 5 is substantially identical to the arrangement shown in FIGURES 1-3 with the exception of the sleeve member 36. In this particular environment the sleeve member 36 is provided with a notch 60' which is arcuate and which has an axis parallel of the bore 42 and lying in a longitudinal plane of the sleeve member 36 passing through the axis of the bore 42. The arrangement of notch 60' is slighly less costly to make than the notch 60 as it can be drilled out of the end surface 40 rather than machined or sawed out as in the case of the notch 60. However, the triangular notch 60 provides for a neater tearing or shearing action as the stress is concentrated in the apex of the triangle but in both cases the notches 60 and 60' function satisfactorily to provide a rip which does not drop pieces downwardly into the lower barrel section 16. Additionally, it will be noted that the bores 42' and 44' are arranged to have their axes parallel rather than at 90° as shown in the modification of FIGURES 1 through 3.

Referring now to FIGURES 6 and 7 there is a further modification of the coupling assembly 34 which discloses the same general arrangement of parts but with the upper section 30' and lower section 32' of the valve stem 28' being noncircular in cross-section. In more detail, the sections 30' and 32' are shown as square in cross-section and consequently the tubular sleeve member 36' is made square in cross-section. The advantage of an arrangement utilizing valve stem sections and a sleeve coupling member which are non-circular in cross-section (for exampe square) is that the whole torque load, when operating the hydrant, to open or close the same, need not be transmitted through the clevis pins. The torque load in such instances will be transmitted between the upper and the lower stem sections by the tubular sleeve member rather than the clevis pins. Although the immediately above described arrangement does have certain advantages, it is preferred to utilize the circular stems and sleeve member shown in FIGURES 1 to 5 inclusive due to simplicity and cost of manufacture.

It will thus be seen that the objects and advantages of the present invention have been fully and effectively accomplished by the foregoing specific embodiments shown in the drawings. The specific embodiments have been shown and described only for the purpose of illustrating the principles of the invention and are subject to some changes and modifications without departing from such principles.

What is claimed is:

1. A stem coupling arrangement for coupling together upper and lower sections of a valve stem of a fire hydrant or the like comprising: a tearable sleeve member having a uniform wall thickness and oppositely disposed end wall surfaces, said sleeve member being made of a ductile material and being arranged to receive the upper end portion of the lower section of the valve stem and the lower end portion of the upper section of the valve stem, said sleeve member having a first pair and a longitudinally spaced second pair of axially aligned bores in the walls thereof, the axis of each pair of bores being normal to and passing through the longitudinal axis of said sleeve member, said first pair of bores being spaced closer to one end wall surface of said sleeve member than said second pair of bores is spaced from the other end wall surface of said sleeve member, said first pair of bores being arranged to align with a transverse bore in the upper end portion of the lower section of the valve stem whereas said second pair of bores is arranged to align with a transverse bore in the lower end portion of the upper section of said valve stem, a pair of notches in the said one end wall surface of said sleeve member longitudinally aligned with the axis of each of said first pair of bores, said notches and said first pair of bores defining therebetween in said sleeve member a longitudinally extending weakened portion, and pin means inserted through said first and second bores in said sleeve member and through the bores in the upper and lower sections of the valve stem; said sleeve member when failing due to separation of the upper section from the lower section of the valve stem tending to rupture along said weakened portion whereby the upper pin will retain the broken parts on the upper section of the valve stem.

2. A stem coupling arrangement as claimed in claim 1 in which each of said notches is triangular in shape with its apex lying in a longitudinal plane of said sleeve member through the axis of said first pair of bores.

3. A stem coupling arrangement as claimed in claim 1 in which each of said notches is semicircular in shape with its axis lying in a longitudinal plane of said sleeve member through the axis of said first pair of bores.

4. A stem coupling arrangement as claimed in claim 1 in which said pin means are clevis pins having cotter pins through the ends thereof for retaining the same in position.

5. A stem coupling arrangement as claimed in claim 1 in which said upper and lower section of said valve stem and said sleeve member are square shaped in cross-section.

6. A stem coupling as claimed in claim 1 including orientation means on said sleeve member to insure proper assembly of said sleeve member on the upper and lower sections of the valve stem, said orientation means comprising a roll pin carried by said sleeve member and extending radially inwardly thereof intermediate said first pair and second pair of bores therein, said roll pin being adapted to engage the ends of the upper and lower sections of said valve stem.

References Cited

UNITED STATES PATENTS

| 1,892,759 | 1/1933 | Woodford. | |
| 1,911,990 | 5/1933 | Cooke | 85—8.1 |
| 2,018,455 | 10/1935 | Lofton | 285—2 |
| 2,166,412 | 7/1939 | Kiesel | 285—2 |

FOREIGN PATENTS 1,208,535   2/1960   France.

CARL W. TOMLEN, *Primary Examiner.*

DAVE W. ANLA, *Assistant Examiner.*

U.S. Cl. X.R.

285—4